United States Patent
Okuno

(10) Patent No.: US 9,741,976 B2
(45) Date of Patent: Aug. 22, 2017

(54) ENERGY STORAGE DEVICE

(71) Applicant: GS Yuasa International Ltd., Kyoto-shi (JP)

(72) Inventor: Yasunori Okuno, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 193 days.

(21) Appl. No.: 14/498,358

(22) Filed: Sep. 26, 2014

(65) Prior Publication Data

US 2015/0093612 A1 Apr. 2, 2015

(30) Foreign Application Priority Data

Sep. 30, 2013 (JP) ................................ 2013-205859

(51) Int. Cl.
| | | |
|---|---|---|
| H01M 2/30 | (2006.01) | |
| H01M 2/02 | (2006.01) | |
| H01M 2/34 | (2006.01) | |
| H01G 11/74 | (2013.01) | |
| H01G 11/78 | (2013.01) | |
| H01G 9/10 | (2006.01) | |
| H01G 11/20 | (2013.01) | |

(52) U.S. Cl.
CPC ............ H01M 2/024 (2013.01); H01G 11/74 (2013.01); H01G 11/78 (2013.01); H01M 2/345 (2013.01); H01G 9/10 (2013.01); H01G 11/20 (2013.01); H01M 2200/20 (2013.01); Y02E 60/13 (2013.01)

(58) Field of Classification Search
CPC ...... H01M 2/024; H01M 2/345; H01G 11/74; H01G 11/78; H01G 9/10; H01G 11/20
See application file for complete search history.

(56) References Cited

U.S. PATENT DOCUMENTS

2014/0234674 A1   8/2014   Matsumoto

FOREIGN PATENT DOCUMENTS

| JP | 7-245090 A | 9/1995 |
|---|---|---|
| JP | 11-224658 A | 8/1999 |
| JP | 2002-260631 A | 9/2002 |
| JP | 2008-234903 A | 10/2008 |
| JP | 2013-101890 A | 5/2013 |
| JP | 2013-191355 A | 9/2013 |
| WO | WO 2013-042164 A1 | 3/2013 |

*Primary Examiner* — Helen O Conley
(74) *Attorney, Agent, or Firm* — McGinn IP Law Group, PLLC.

(57) ABSTRACT

An energy storage device includes an electrode assembly, a case, a terminal part, and a current collector, wherein the terminal part has: an external terminal having at least a part exposed to outside of the case; a conduction member configured to make the external terminal and the current collector conductive; a decoupling mechanism configured to decouple the conduction member, or hinder a conduction state of the conduction member; and an auxiliary terminal disposed spaced from the external terminal, and having at least a part exposed to the outside of the case, the auxiliary terminal being electrically connected to the current collector.

20 Claims, 5 Drawing Sheets

ENERGY STORAGE DEVICE

CROSS-REFERENCE TO RELATED APPLICATIONS

This application claims the benefit of Japanese patent application No. 2013-205859, filed on Sep. 30, 2013, which is incorporated by reference.

FIELD

The present invention relates to an energy storage device capable of being charged-discharged.

BACKGROUND

Heretofore, an energy storage device capable of being charged-discharged such as a secondary battery is known. This energy storage device includes an electrode assembly, a case that houses the electrode assembly along with electrolyte solution, an external terminal that is mounted on the case, and a current collector that is disposed in the case and connected to the electrode assembly. As shown in FIG. 6, this type of energy storage device may include a conduction member 105 that makes an external terminal 103 and the current collector 104 conductive, and a conduction member cutting mechanism 106, in addition to the electrode assembly 101, the case 102, and the current collector 104 (see JP-A-7-245090). In such an energy storage device, the conduction member cutting mechanism 106 has a cutting part 107. When the internal pressure of the case 102 rises up to predetermined pressure, the cutting part 107 is lifted, and an edge 107a of the cutting part 107 cuts the conduction member 105.

In the energy storage device 100 having the above configuration, overcharge or overvoltage caused by charging or the like raises the internal pressure of the case due to gas generated by the decomposition of electrolyte solution and the like. Then, when the internal pressure rises up to a predetermined value, the conduction member cutting mechanism 106 cuts the conduction member 105. Consequently, the energy storage device 100 stops the supply of current from the outside to the electrode assembly 101. As a result, the generation of gas in the case 102 is reduced, and a rise in internal pressure due to the generation of the gas is reduced. Thus, the generation of the gas is suppressed, so that rupture, explosion, and the like of the case is prevented, and the electrolyte solution and the like can be prevented from being released outside the case.

In the energy storage device 100, in an abnormal case where the internal pressure of the case 102 rises by an influence of overcharge, overvoltage, or the like, cutting of the conduction member 105 decouples an energization path that has been allowing conduction from the external terminal 103 to the electrode assembly 101. Accordingly, in the above energy storage device 100, the energization path is decoupled in the abnormal case, and therefore electric power stored in the electrode assembly 101 cannot be discharged to the outside.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the invention is to provide an energy storage device capable of discharging from an electrode assembly to the outside, even after a conduction member for making an external terminal and the electrode assembly conductive each other is decoupled or the conduction state is lowered at the time of overcharge or overvoltage.

An energy storage device according to an aspect of the present invention includes: an electrode assembly; a case configured to house the electrode assembly; a terminal part mounted on the case; and a current collector connected to the electrode assembly in the case, wherein the terminal part has: an external terminal having at least a part exposed to outside of the case; a conduction member configured to make the external terminal and the current collector conductive each other; a decoupling mechanism configured to decouple the conduction member, or hinder a conduction state of the conduction member; and an auxiliary terminal disposed spaced from the external terminal, and having at least a part exposed to the outside of the case, the auxiliary terminal being electrically connected to the current collector.

BRIEF DESCRIPTION OF THE DRAWINGS

The foregoing and other features of the present invention will become apparent from the following description and drawings of an illustrative embodiment of the invention in which.

DESCRIPTION OF EMBODIMENTS

Figure 1:
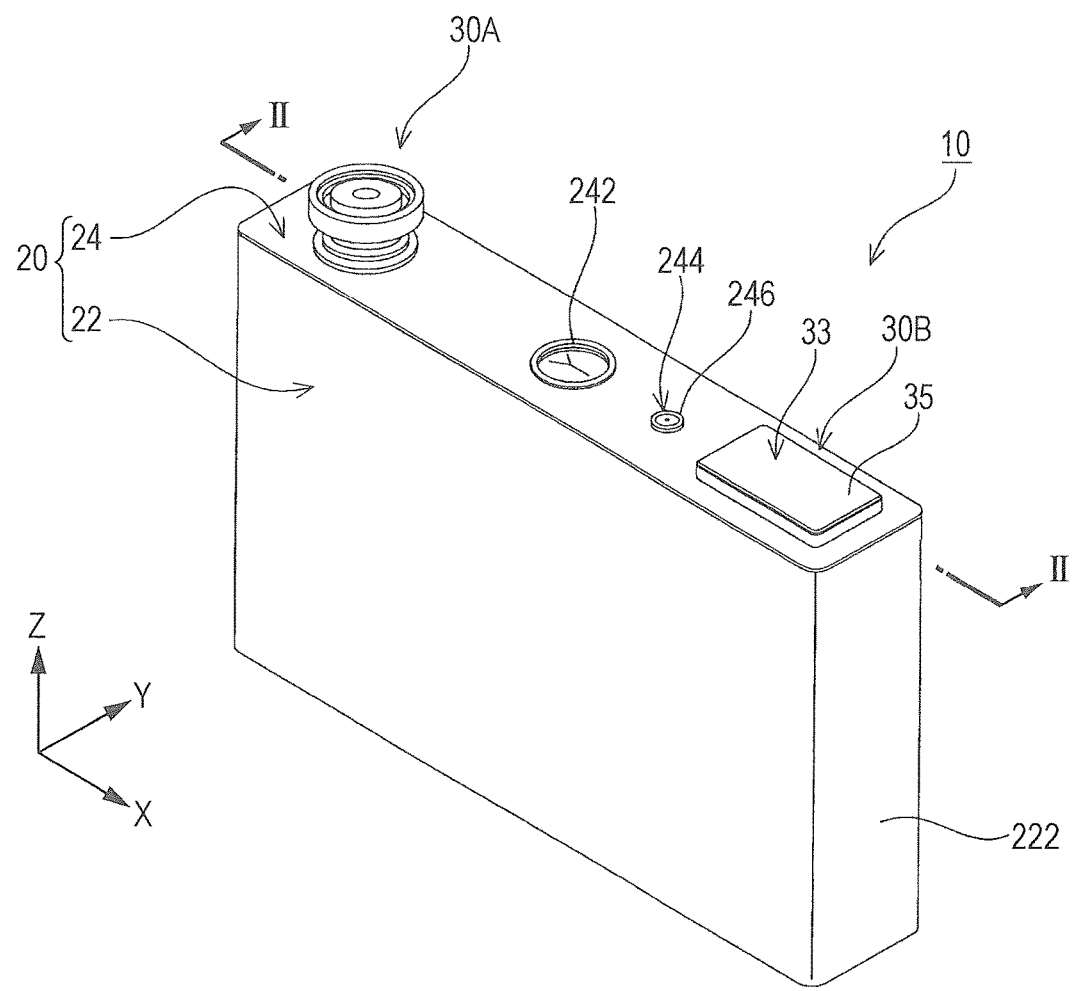
FIG. 1 is a perspective view of a battery according to an embodiment.

An energy storage device according to an aspect of the present invention includes: an electrode assembly; a case configured to house the electrode assembly; a terminal part mounted on the case; and a current collector connected to the electrode assembly in the case, wherein the terminal part has: an external terminal having at least a part exposed to outside of the case; a conduction member configured to make the external terminal and the current collector conductive each other; a decoupling mechanism configured to decouple the conduction member, or hinder a conduction state of the conduction member; and an auxiliary terminal disposed spaced from the external terminal, and having at least a part exposed to the outside of the case, the auxiliary terminal being electrically connected to the current collector.

According to such a configuration, when the internal pressure of the case rises due to gas generated from electrolyte solution and the like due to overcharge, overvoltage, or the like when, for example, an external power supply or the like is connected to the external terminal to perform charging, the decoupling mechanism can decouple the conduction member, or hinder the conduction state of the conduction member. Consequently, it is possible to stop supplying a current from the external terminal to the electrode assembly, or to reduce the supply of a current to the electrode assembly, so that it is possible to reduce the generation of the gas from the electrolyte solution and the like in the case and to restrain a rise in the internal pressure of the case. In addition, the auxiliary terminal is electrically connected to the current collector, and therefore it is possible to perform discharging from, for example, the electrode assembly in an overcharge state to the outside through the auxiliary terminal even after the conduction member is decoupled.

Furthermore, the external terminal and the auxiliary terminal are provided in the terminal part, so that, in the energy storage device, portions (i.e., the external terminal and the auxiliary terminal) connected to cables, bus bars and the like during charging work, discharging work, or the like are collected in the terminal part. Consequently, connection work of the cables and the like during charging/discharging work is facilitated.

The conduction member may have a fragile part having strength smaller than other portion in the conduction member, and the decoupling mechanism may have a pressure receiving deformation part disposed at a position where the internal pressure is transmitted, the pressure receiving deformation part being configured to decouple the conduction member by deforming at least a part when the internal pressure rises up to the predetermined value, and breaking the fragile part.

According to such a configuration, the fragile part is broken by utilizing the deformation of the pressure receiving deformation part when the internal pressure of the case rises up to the predetermined value, so that the conduction member can be decoupled.

The pressure receiving deformation part may have a conductive property, and be connected so as to allow the external terminal and the conduction member to be conductive.

Thus, the pressure receiving deformation part is disposed so as to configure a part of an energization path in the terminal part, so that the terminal part can be downsized compared to a case where the arrangement space of the pressure receiving deformation part is separately secured at a position deviated from the energization path.

In this case, the conduction member may have: the fragile part; a first portion fixed to the pressure receiving deformation part; and a second portion provided on a side closer to the current collector than the first portion in an energizing direction, the fragile part may connect the first portion and the second portion, and the pressure receiving deformation part may be deformed such that a portion fixed to the first portion is separated from the second portion, when the internal pressure rises up to the predetermined value.

According to such a configuration, when the internal pressure of the case rises up to the predetermined value due to overcharge or the like, the pressure receiving deformation part is deformed, and the first portion is pulled in a direction separated from the second portion, and the fragile part is broken. Consequently, the conduction member is decoupled, so that it is possible to stop supplying a current from the external terminal to the electrode assembly.

The case may have a gas release vent configured to release gas in the case to the outside when the internal pressure rises up to a first value, and the fragile part may be broken by deformation of the pressure receiving deformation part, when the internal pressure of the case rises up to a second value that is greater than normal pressure and less than the first value.

According to such a configuration, the conduction member is decoupled before gas in the case rises up to the internal pressure (first value) at which the gas is released from the gas release vent to the outside, and the supply of a current from the outside to the electrode assembly through the external terminal is stopped. Consequently, it is possible to reduce the generation of gas due to the supply of the current to the electrode assembly before the gas release vent is opened (operated), and to restrain a rise in the internal pressure.

In addition, even when the internal pressure continues to rise even after the supply of the current to the electrode assembly is stopped, the gas release vent releases the gas to the outside when the internal pressure rises up to the first value, so that the pressure in the case is reduced. Therefore, it is possible to more reliably prevent the rupture of the case due to the rise in the internal pressure.

An energy storage device according to another aspect of the present invention includes: an electrode assembly; a case configured to house the electrode assembly; a terminal part mounted on the case; and a current collector connected to the electrode assembly in the case, wherein the terminal part has: an external terminal having at least a part exposed to outside of the case; a conduction member configured to make the external terminal and the current collector conductive; a decoupling mechanism configured to decouple the conduction member, when internal pressure of the case rises up to a predetermined value; and an auxiliary terminal disposed spaced from the external terminal, and having at least a part exposed to the outside of the case, the auxiliary terminal being electrically connected to the current collector.

According to such a configuration, when the internal pressure of the case rises up to the predetermined value due to gas generated from electrolyte solution and the like due to overcharge, overvoltage, or the like when, for example, an external power supply is connected to the external terminal to perform charging, the decoupling mechanism decouples the conduction member. Consequently, it is possible to stop supplying a current from the external terminal to the electrode assembly, so that it is possible to reduce the generation of the gas from the electrolyte solution and the like in the case and to restrain further rise in the internal pressure of the case. In addition, the auxiliary terminal is electrically connected to the current collector, and therefore it is possible to perform discharging from, for example, the electrode assembly in an overcharge state to the outside through the auxiliary terminal even after the conduction member is decoupled.

Furthermore, the external terminal and the auxiliary terminal are provided in the terminal part, so that, in the energy storage device, portions (i.e., the external terminal and the auxiliary terminal) connected to cables, bus bars and the like during charging work, discharging work, or the like are collected in the terminal part. Consequently, connection work of the cables and the like during charging-discharging work is facilitated.

The case may include a case main body having a bottom wall part and a peripheral wall, and configured to house the electrode assembly, and a lid configured to close an opening of the case main body, and an interval between the current collector and the decoupling mechanism may be larger than an interval between the current collector and an outer surface of the lid, as viewed in a normal direction of the lid.

The case may include a case main body having a bottom wall part and a peripheral wall, and configured to house the electrode assembly, a lid configured to close an opening of the case main body, and a rivet configured to penetrate the lid, and an interval between the current collector and the decoupling mechanism may be larger than an interval between the current collector and an outer surface of the rivet, as viewed in a normal direction of the lid.

According to such a configuration, the decoupling mechanism is disposed outside the case, and therefore an electrode assembly having larger size can be housed in the case main body.

The case may include a case main body having a bottom wall part and a peripheral wall, and configured to house the electrode assembly, and a lid configured to close an opening of the case main body, and a conduction path between the external terminal and the current collector, and a conduction path between the auxiliary terminal and the current collector may pass through a single penetration hole provided in the lid.

According to such a configuration, in the energy storage device, portions connected to cables, bus bars and the like during charging work, discharging work, or the like are collected in the terminal part. Therefore, connection work of the cables and the like during charging/discharging work is facilitated.

A portion, exposed to the outside of the case, of the auxiliary terminal may be provided substantially concentrically with a portion, exposed to the outside of the case, of the external terminal.

The auxiliary terminal may have a cylindrical large diameter part, and a cylindrical small diameter part, and at least the large diameter part is exposed to the outside of the case, and the external terminal, the conduction member, and the decoupling mechanism may be each at least partially housed in the large diameter part.

According to such a configuration, a component such as the external terminal can be housed in the auxiliary terminal, and therefore space efficiency is improved. Additionally, the auxiliary terminal can prevent internal components such as the conduction member and the decoupling mechanism from being exposed.

Hereinafter, an embodiment of the present invention will be described with reference to FIG. 1 to FIG. 5. An energy storage device according to the present embodiment is a non-electrolyte secondary battery (hereinafter simply referred to as a "battery") such as a lithium ion secondary battery.

Figure 2:
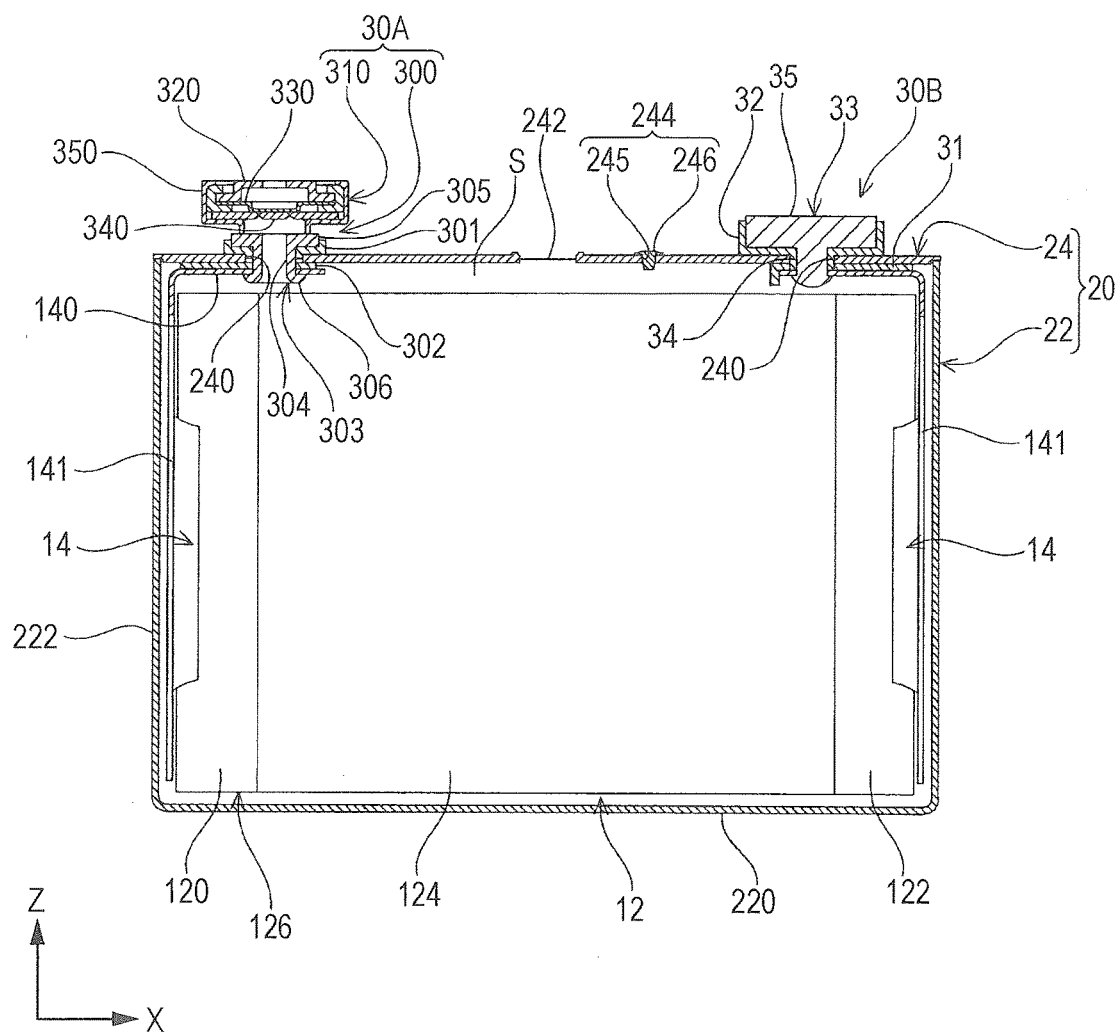
FIG. 2 is a sectional view at position II-II of FIG. 1.
Figure 3:
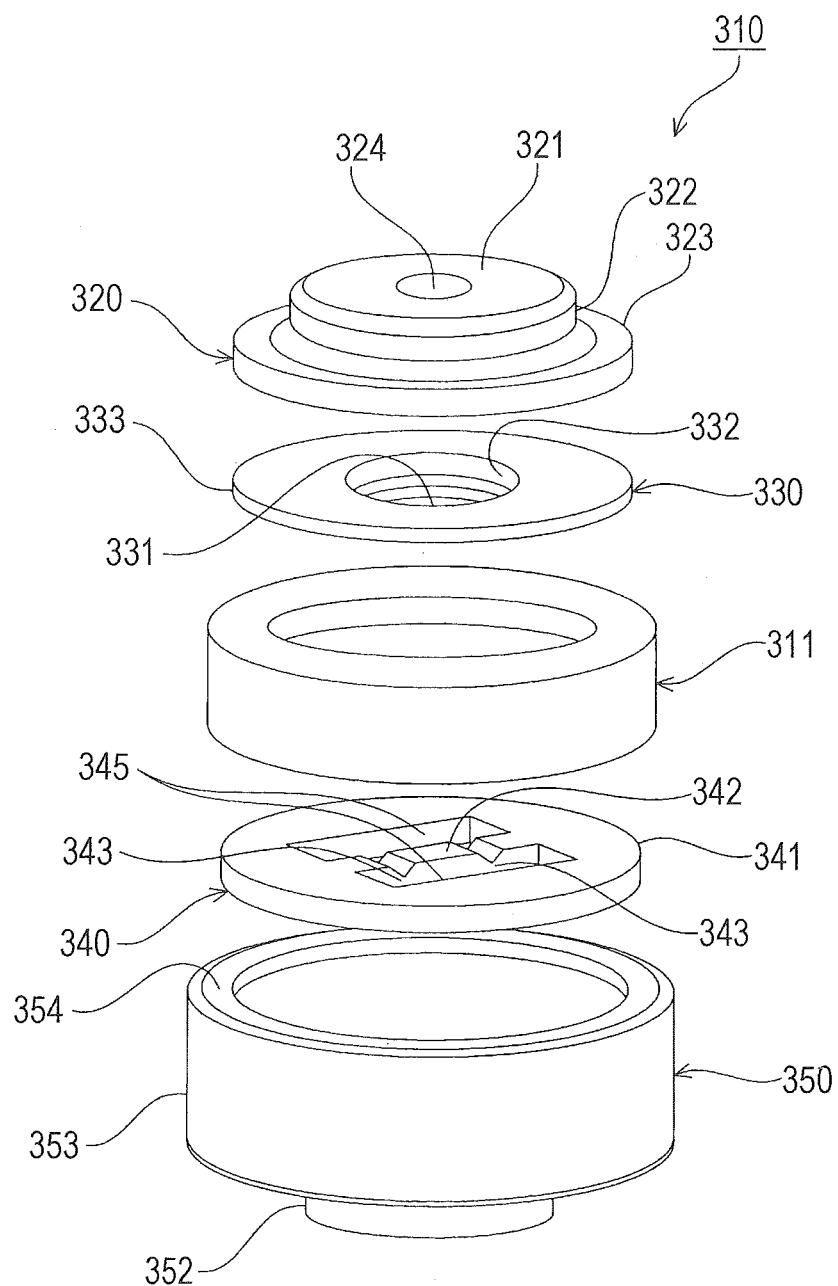
FIG. 3 is an enlarged exploded perspective view of a terminal main assembly in a terminal part for a positive electrode of the battery.
Figure 4:
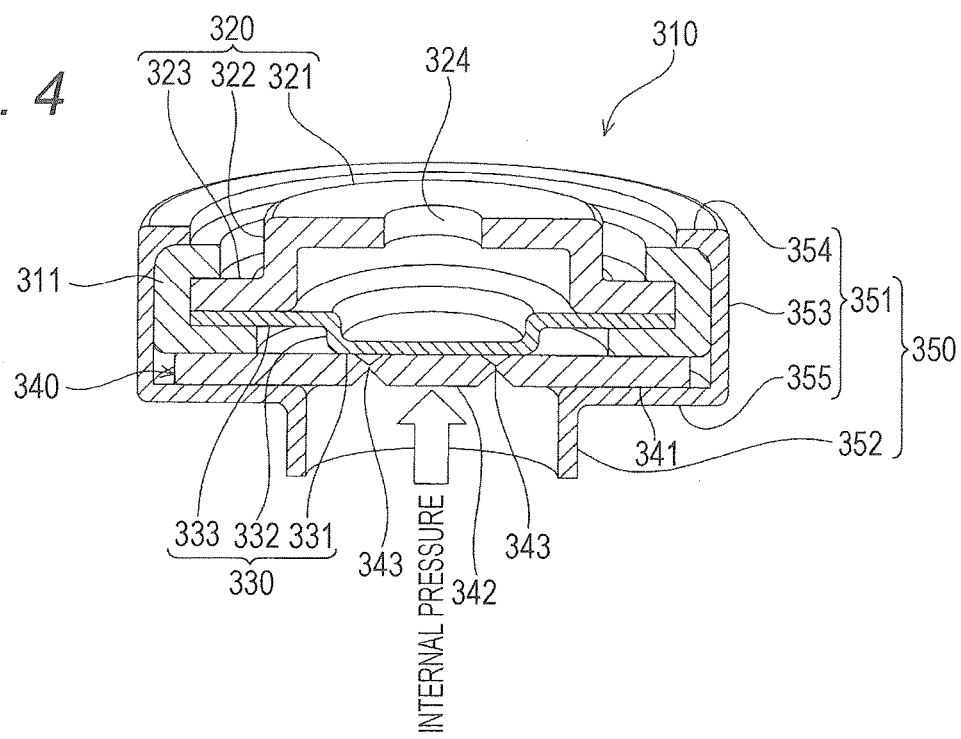
FIG. 4 is a view for illustrating the operation of a pressure receiving deformation part in the terminal main assembly, and illustrates a state where the internal pressure of a case is normal pressure.
Figure 5:
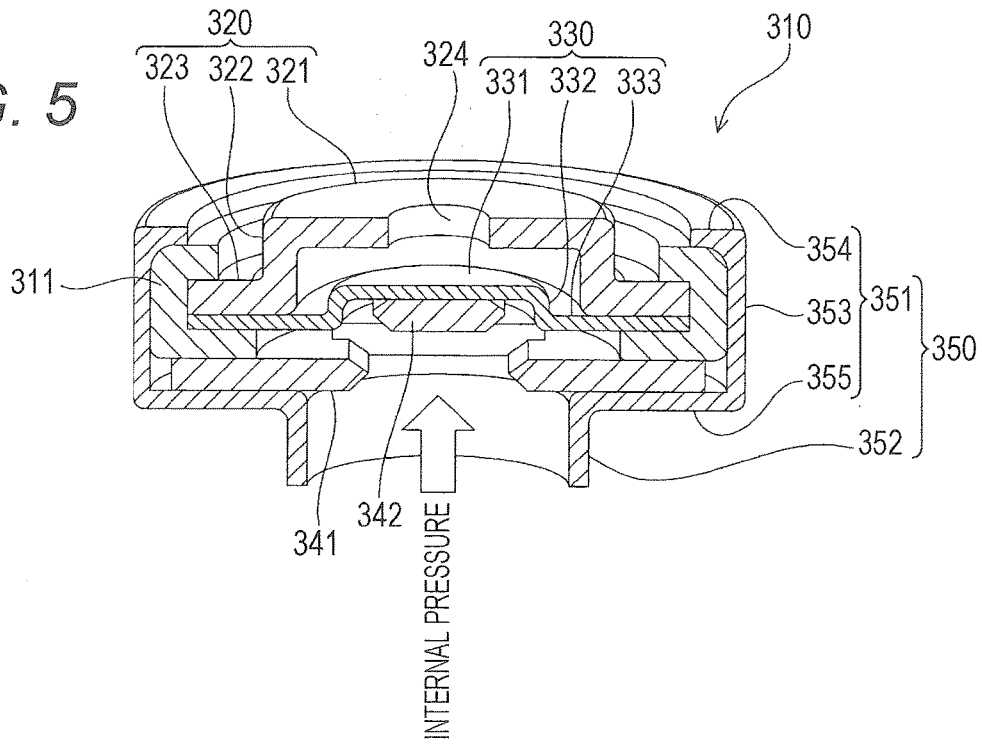
FIG. 5 is a view for illustrating the operation of the pressure receiving deformation part in the terminal main assembly, and illustrates a state where the internal pressure of the case rises up to a second value and the pressure receiving deformation part is deformed.
Figure 6:
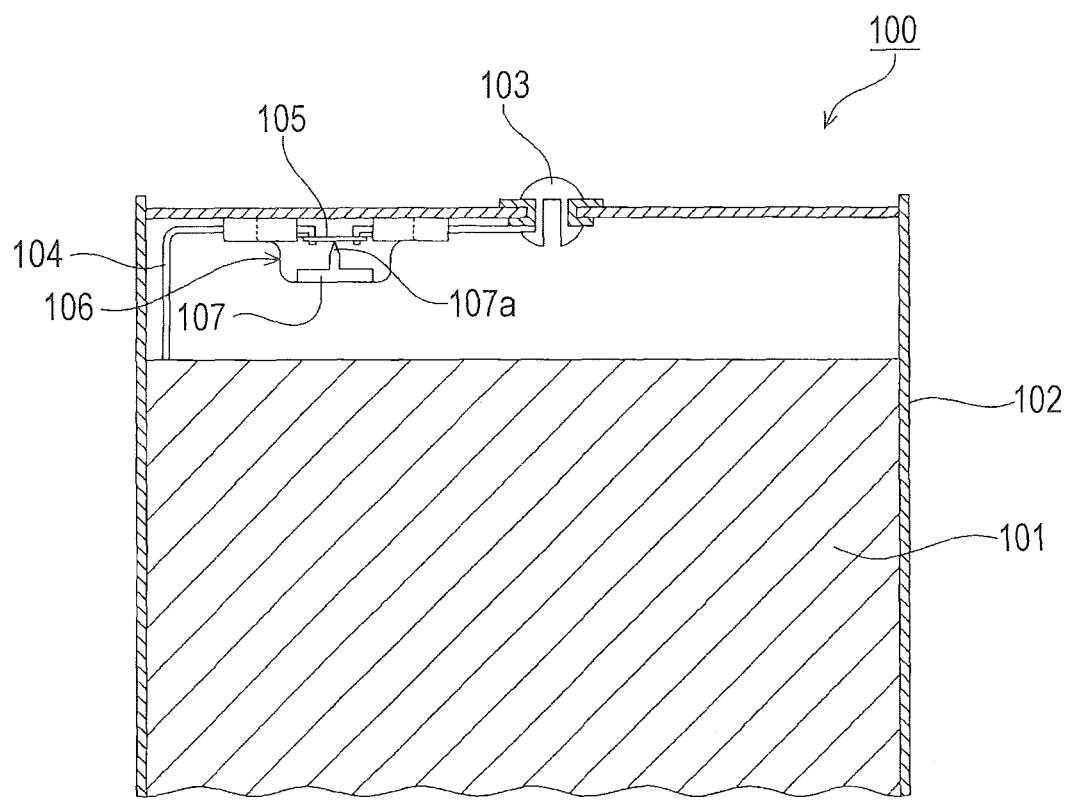
FIG. 6 is a longitudinal sectional view of a conventional energy storage device.

As shown in FIG. 1 and FIG. 2, a battery 10 includes a case 20, an electrode assembly 12, a pair of terminal parts 30A and 30B, and a pair of current collectors 14 and 14.

The case 20 has a case main body 22 and a lid 24. This case 20 houses the electrode assembly 12, the pair of current collectors 14 and 14, electrolyte solution, and the like in an internal space S surrounded by the case main body 22 and the lid 24. The case main body 22 and the lid 24 are formed by aluminum based metallic materials such as aluminum and aluminum alloy. An end of the case main body 22 and an end of the lid 24 are welded to each other, thereby forming the case 20.

The case main body 22 has a flat bottomed prismatic cylindrical shape. Specifically, the case main body 22 has a bottom wall part 220, and a prismatic cylindrical shaped peripheral wall 222 erected in the normal direction of the bottom wall part 220 from the periphery of the bottom wall part 220. The bottom wall part 220 has a rectangular shape that is formed long in one direction and has arc-shaped four corners in plan view. Hereinafter, the long side direction of the bottom wall part 220 is defined as an X-axis direction, the short side direction of the bottom wall part 220 is defined as a Y-axis direction, and the normal direction of the bottom wall part 220 is defined as a Z-axis direction.

The lid 24 is overlapped with an opening peripheral part of the case main body 22 to close an opening of the case main body 22. The lid 24 has a shape corresponding to the outer periphery (outline) of the case main body 22 in plan view. That is, the lid 24 is a rectangular sheet material that is formed long in the X-axis direction and has arc-shaped four corners in plan view.

The lid 24 is provided with a pair of terminal penetration holes 240 and 240, a gas release vent 242, and an pouring part 244 (see FIG. 2). The pair of terminal penetration holes 240 is provided with an interval in the X-axis direction in the lid 24. The gas release vent 242 has a thin part and a breaking groove, and is provided on the central part of the lid 24. When the internal pressure (gas pressure) of the case 20 becomes larger than a predetermined value (first value), the gas release vent 242 is torn from the breaking groove to allow the inside and the outside of the case 20 to communicate with each other, and releases gas in the case 20 therefrom. Consequently, the gas release vent 242 reduces the increased internal pressure of case 20. The pouring part 244 has an electrolyte solution filling hole 245 that is provided in the lid 24, and a plug 246 that closes this electrolyte solution filling hole 245. The electrolyte solution filling hole 245 is an opening for filling electrolyte solution in the case 20, and the plug 246 is inserted into the electrolyte solution filling hole 245 after electrolyte solution filling, to close the electrolyte solution filling hole 245.

The electrode assembly 12 has a belt-shaped positive electrode sheet 120, a belt-shaped negative electrode sheet 122, and a belt-shaped separator 124. The separator 124 is interposed between the positive electrode sheet 120 and the negative electrode sheet 122, and the positive electrode sheet 120 and negative electrode sheet 122 are wound in a long cylindrical shape while being displaced from each other in a width direction (direction orthogonal to the longitudinal direction of the belt-shaped sheets: X-axis direction in FIG. 2), thereby forming the electrode assembly 12 (see FIG. 2).

The positive electrode sheet 120 carries a positive electrode active material on a belt-shaped aluminum foil surface, for example. The negative electrode sheet 122 carries a negative electrode active material on a belt-shaped copper foil surface, for example. The positive electrode sheet 120 and the negative electrode sheet 122 each have an active material uncoated part on an edge in the width direction (X-axis direction). Consequently, in the ends of the electrode assembly 12 in the width direction (X-axis direction), aluminum foil and copper foil where the active materials are uncoated are exposed. Thus, the electrode assembly 12 includes a protrusion part 126 on a positive electrode side (positive electrode of the electrode assembly) that is formed by protruding only the positive electrode sheet 120 (positive electrode active material uncoated portion) on one end in the width direction (X-axis direction), and a protrusion part 126 on a negative electrode side (negative electrode of the electrode assembly) that is formed by protruding only the negative electrode sheet 122 (negative electrode active material uncoated portion) on the other end in the width direction (X-axis direction).

The whole of the electrode assembly 12 formed as described above is covered with an insulation cover (not shown), so that the electrode assembly 12 is housed in the case 20 while being insulated from the case 20.

Current collectors 14 are arranged along the electrode assembly 12 in the case 20, and makes the protrusion parts 126 of the electrode assembly 12 and the terminal parts 30A and 30B (external terminals 320 and 33) conductive. The battery 10 of the present embodiment has the current collector 14 for a positive electrode, and the current collector 14 for a negative electrode. The current collector 14 for the positive electrode makes the protrusion part 126 on the positive electrode side and a terminal part 30A for the positive electrode conductive. The current collector 14 for the negative electrode makes the protrusion part 126 on the negative electrode and a terminal part 30B for the negative electrode conductive. In the present embodiment, the current collector 14 for the positive electrode is formed by, for example, aluminum, aluminum alloy, or the like. The current collector 14 for the negative electrode is formed by, for example, copper, copper alloy, or the like.

The current collectors 14 have terminal side connection parts 140 that are directly or indirectly connected to the terminal parts 30A and 30B, and electrode assembly side connection parts 141 that are directly or indirectly connected to the protrusion parts 126 of the electrode assembly 12. By bending a plate shaped metal material that is cut in a predetermined shape, the current collectors 14 are each molded in such a shape (substantially L-shape) as to be bent on a boundary part between the terminal side connection part 140 and the electrode assembly side connection part 141 along the electrode assembly 12 in front view.

In the battery 10 of the present embodiment, the terminal part 30A for the positive electrode and the terminal part 30B for the negative electrode are mounted outside the case 20. Specific description is as follows.

The terminal part 30A for the positive electrode has a terminal base part 300 and a terminal main assembly 310. This terminal part 30A for the positive electrode has an end on a side close to the terminal base part 300 that is connected to the terminal side connection part 140 of the current collector 14, and a portion on a side close to the terminal main assembly 310 that is mounted on the lid 24 while being exposed to the outside.

The terminal base part 300 has a gasket 301, an insulation member 302, and a fixing rivet 303.

The gasket 301 is formed by a member having an insulation property, is disposed between the fixing rivet 303, and the periphery of the terminal penetration hole 240 in the lid 24 (specifically, an inner peripheral surface that defines the peripheral upper surface of the terminal penetration hole 240 in the lid 24 and the terminal penetration hole 240), and insulates the fixing rivet 303 from the lid 24. Additionally, the gasket 301 seals a space between the fixing rivet 303 and the inner peripheral surface that defines the terminal penetration hole 240.

The insulation member 302 is disposed between the lid 24 and the terminal side connection part 140 of the current collector 14, and insulates the lid 24 from the terminal side connection part 140. The insulation member 302 of the present embodiment has a plate shape along the lower surface (back surface) of the lid 24. This insulation member 302 is penetrated by the fixing rivet 303.

The fixing rivet 303 has a rivet main assembly 304, a flange 305, and a caulking part 306, and is formed by a conductive material. The rivet main assembly 304 is a cylindrical part that vertically extends so as to be inserted into the terminal penetration hole 240 of the lid 24. The flange 305 expands outward in a radial direction from the upper end of the rivet main assembly 304. The caulking part 306 is provided in the lower end of the rivet main assembly 304, and is formed by caulking the lower end of the cylindrical portion (rivet main assembly 304). While the rivet main assembly 304 penetrates the lid 24, the insulation member 302, and the terminal side connection part 140 of the current collector 14 which are vertically laminated, these respective members 24, 302 and 104 are sandwiched by the flange 305 and the caulking part 306 from the upper and lower sides, so that the fixing rivet 303 fixes the lid 24, the insulation member 302, and the terminal side connection part 140.

As shown in FIG. 2 to FIG. 5, the terminal main assembly 310 has the external terminal 320, a pressure receiving deformation part 330, a disk shaped conduction member 340, an insulating packing 311, and an outer cylindrical part 350. The lower end of the terminal main assembly 310 and the upper end of the fixing rivet 303 (specifically, upper surface of the flange 305) are welded, so that the terminal main assembly 310 is connected to the fixing rivet 303. In the terminal main assembly 310, the respective members other than the insulating packing 311 (specifically, the external terminal 320, the pressure receiving deformation part 330, the disk shaped conduction member 340, and the outer cylindrical part 350) are formed by members having conductive properties such as metal.

At least a part of the external terminal 320 is exposed to the outside, and a cable, a bus bar, or the like is connected thereto. This external terminal 320 is formed by aluminum, aluminum alloy, or the like, and has a shape in which the central part of the disk is protruded upward. Specifically, the external terminal 320 has a top wall part 321 having a round outline in plan view, a short cylindrical step 322 that extends downward from the periphery of the top wall part 321, and an annular outer flange 323 that expands outward in a radial direction from the lower end of the step 322. A penetration hole 324 is formed at the central part of the top wall part 321 in plan view. By this penetration hole 324, a space surrounded by the external terminal 320 and the pressure receiving deformation part 330 is communicated with the outside.

The pressure receiving deformation part 330 is disposed at a position where the internal pressure of the case 20 is transmitted, and is deformed when the internal pressure of the case 20 rises up to a second value, so that an energization path from the external terminal 320 in the terminal part 30A to the current collectors 14 is decoupled. The second value is greater than a value when the inside of the case 20 is in normal pressure, and less than the first value (value when the gas release vent 242 is opened).

The pressure receiving deformation part 330 is formed by aluminum, aluminum alloy, or the like, and has a shape in which the central part of the disk is protruded downward. Specifically, the pressure receiving deformation part 330 has a bottom wall part 331 having a round outline in plan view, a short cylindrical step 332 that extends upward from the periphery of the bottom wall part 331, and an annular outer flange 333 that expands outward in a radial direction from the upper end of the step 332. In the present embodiment, the outer diameter of the bottom wall part 331 is slightly smaller than the outer diameter of the top wall part 321 of the external terminal. Additionally, the outer diameter of the annular outer flange 333 is substantially the same as the outer diameter of the annular outer flange 323 of the external terminal 320. When pressure applied from the below is the above second value (e.g., lower than 0.6 to 0.8 MPa (the gas release vent (0.9 to 1.1 MPa)) or more, the step 332 is reversed, and the pressure receiving deformation part 330 is deformed such that the bottom wall part 331 is lifted above the annular outer flange 333. That is, when pressure applied from the below is the second value or more, a concave portion formed by the bottom wall part 331 and the short cylindrical step 332 (concave portion in plan view) is pressed upward so as to be reversed, and becomes a convex portion that protrudes upward (see FIG. 4 and FIG. 5).

The pressure receiving deformation part 330 thus configured is disposed on the lower side of the external terminal 320. More specifically, the external terminal 320 is overlapped on the upper side of the pressure receiving deformation part 330 such that the annular outer flange 323 of the external terminal 320 and the annular outer flange 333 of the pressure receiving deformation part 330 are vertically overlapped.

The disk shaped conduction member 340 has an outer portion (second portion) 341, a central fixing portion (first portion) 342, and fragile parts 343 that connect the outer portion 341 and the central fixing portion 342, and makes the outer cylindrical part 350 and the pressure receiving deformation part 330 conductive. The disk shaped conduction member 340 is a disk shaped member formed by aluminum, aluminum alloy, or the like. Specifically, the disk shaped conduction member 340 has an outer diameter that is substantially same as the outer diameter of the pressure receiving deformation part 330 in plan view. The disk shaped conduction member 340 is formed by forming a pair of substantially rectangular penetration holes 345 on the central part of the disk such that respective long sides of the penetration holes 345 and 345 are parallel and the penetration holes 345 are provided at an interval in a short side direction. In the present embodiment, the both ends of the central fixing portion 342 in a radial direction, and the outer portion 341 that surrounds the central fixing portion 342 spaced from the central fixing portion 342 in the radial direction are connected by the two fragile parts 343 and 343. The number of the fragile parts 343 is not limited to two, and one, or at least three may be employed.

The fragile parts 343 of the present embodiment each have a thickness smaller than the thickness of other portions (the outer portion 341 and the central fixing portion 342), so that the strength thereof is smaller than the strength of the outer portion 341 and the central fixing portion 342. Specific configurations of the fragile parts 343 are not limited. For example, the width dimension or the cross sectional area of each fragile part 343 may be smaller than the outer portion 341 and the central fixing portion 342, and be formed by a member softer than the outer portion 341 and the central fixing portion 342.

The disk shaped conduction member 340 thus configured is disposed on the lower side of the pressure receiving deformation part 330. Then, the central fixing portion 342 is fixed to the bottom wall part 331 of the pressure receiving deformation part 330. In the present embodiment, the upper surface of the central fixing portion 342 and the lower surface of the bottom wall part 331 of the pressure receiving deformation part 330 are welded. Thus, the central fixing portion 342 is fixed to the bottom wall part 331 of the pressure receiving deformation part 330, and therefore, when the pressure receiving deformation part 330 is deformed by a rise in the internal pressure of the case 20, the central fixing portion 342 is pulled upward, and the fragile parts 343 are broken. Consequently, the central fixing portion 342 and the outer portion 341 are decoupled.

The insulating packing 311 is formed by an insulating material, and is disposed between the outer cylindrical part 350, and the external terminal 320 and the pressure receiving deformation part 330, and between the annular outer flange 333 of the pressure receiving deformation part 330 and the outer portion 341 of the disk shaped conduction member 340. This insulating packing 311 insulates the outer cylindrical part 350 from the external terminal 320 and the pressure receiving deformation part 330, and insulates the annular outer flange 333 of the pressure receiving deformation part 330 from the outer portion 341 of the disk shaped conduction member 340. Additionally, the insulating packing 311 seals a space between the outer cylindrical part 350, and the external terminal 320 and the pressure receiving deformation part 330, and seals a space between the annular outer flange 333 of the pressure receiving deformation part 330 and the outer portion 341 of the disk shaped conduction member 340.

The outer cylindrical part 350 has a large diameter part (auxiliary terminal) 351, and a small diameter part 352 that is connected to the lower side of the large diameter part 351. This outer cylindrical part 350 is a cylindrical portion formed by aluminum, aluminum alloy, or the like. Although the large diameter part 351 and the small diameter part 352 are integrally formed in the outer cylindrical part 350 of the present embodiment, but are not limited to this configuration. The large diameter part 351 and the small diameter part 352 may be separated from each other.

The large diameter part 351 has a cylinder part 353 that surrounds the external terminal 320, the pressure receiving deformation part 330, and the disk shaped conduction member 340 whose plan views are round, in a circumferential direction from the outside, an annular inner flange 354 that extends from the upper end of the cylinder part 353 toward the radially inner side, and a bottom part 355 that extends from the lower part of the cylinder part 353 toward the upper end of the radially inner small diameter part 352.

The annular inner flange 354 has an upper end surface that is located at substantially the same height as the upper end surface of the top wall part 321 of the external terminal, and is formed with a predetermined interval between the radially inner end of the annular inner flange 354, and the step 322 of the external terminal. This annular inner flange 354, and the bottom part 355 located below the annular inner flange 354 vertically sandwich the outer portion 341 of the disk shaped conduction member 340, the lower end of the insulating packing 311, the annular outer flange 333 of the pressure receiving deformation part 330, the annular outer flange 323 of the external terminal 320, and the upper end of the insulating packing 311 therebetween. Consequently, the external terminal 320, the pressure receiving deformation part 330, the disk shaped conduction member 340, and the insulating packing 311 are fixed to each other in the large diameter part 351.

The small diameter part 352 is a cylindrical portion that has an outer diameter smaller than the outer diameter of the large diameter part 351, and has an inner diameter larger than the inner diameter of the rivet main assembly 304 of the fixing rivet 303. The small diameter part 352 is formed integrally with the large diameter part 351 such that the center of the small diameter part 352 coincides with the center of the large diameter part 351. Additionally, the lower end of the small diameter part 352 is welded to the flange 305 such that the center of the small diameter part 352 coincides with the center of the rivet main assembly 304 of the fixing rivet 303. Consequently, the small diameter part 352 (outer cylindrical part 350) is made conductive with the current collectors 14 through the fixing rivet 303. Additionally, the internal space of the case 20 is communicated with a space on the lower side of the pressure receiving deformation part 330 in the outer cylindrical part 350 through hollow parts of the small diameter part 352 and the rivet main assembly 304 of the fixing rivet 303. Therefore, the internal pressure of the case 20 is transmitted to the pressure receiving deformation part 330.

In the present embodiment, the disk shaped conduction member 340, the small diameter part 352 of the outer cylindrical part 350, and the fixing rivet 303 are conduction members that makes the pressure receiving deformation part 330 and the current collector 14 conductive. Additionally, the large diameter part 351 configures an auxiliary terminal. This auxiliary terminal (large diameter part) 351 is electrically connected to the current collector 14. Specifically, the auxiliary terminal (large diameter part) 351 is made conductive with current collector 14 (electrode assembly 12) through the small diameter part 352 and the fixing rivet 303 even after the disk shaped conduction member 340 is decoupled by the pressure receiving deformation part 330 in the terminal part 30A. Therefore, discharging work from the auxiliary terminal 351 to the electrode assembly 12 can be performed in the battery 10, also after the above division.

The terminal part 30B for the negative electrode includes an insulation member 31, a gasket 32, and the external terminal 33. The insulation member 31 is disposed between the lid 24 and the terminal side connection part 140 of the current collector 14 for the negative electrode, and insulates the lid 24 from the terminal side connection part 140. The gasket 32 is disposed between the external terminal 33 and the lid 24 to insulate the external terminal 33 from the lid 24. Additionally, the gasket 32 seals a space between the external terminal 33 and an inner peripheral surface that defines the terminal penetration hole 240 in the lid 24. The external terminal 33 has a solid shaft part 34 that vertically extends so as to be inserted into the terminal penetration hole 240 of the lid 24, and a flange 35 that expands from the upper end of the shaft part 34 in the radial direction of the shaft part. The flange 35 of the external terminal 33 for the negative electrode is formed in a substantial rectangle in plan view (see FIG. 1). In the external terminal 33, in a state where the shaft part 34 penetrates the gasket 32, the lid 24, the insulation member 31, and the terminal side connection parts 140 in this order, the lower end of the shaft part 34 is caulked. This caulked portion and the flange 35 sandwich the gasket 32, the periphery of the terminal penetration hole 240 of the lid 24, the insulation member 31, and the terminal side connection part 140 of the current collector 14 therebetween, so that the respective members 32, 24, 31 and 140 are fixed to each other.

As shown in FIG. 2, as viewed in the normal direction of the lid 24 (Z direction of FIG. 2), an interval between the terminal side connection part 140 of the current collector 14 and the disk shaped conduction member 340 is larger than an interval between the terminal side connection part 140 of the current collector 14 and the outer surface of the lid 24.

As viewed in the normal direction of the lid 24, the interval between the terminal side connection part 140 of the current collector 14 and the disk shaped conduction member 340 is larger than an interval between the terminal side connection part 140 of the current collector 14 and the outer surface of the fixing rivet 303.

A conduction path between the external terminal 320 and the current collector 14, and a conduction path between the large diameter part 351 that functions as the auxiliary terminal, and the current collector 14 pass through the same penetration hole provided in the lid 24.

The large diameter part 351 is provided substantially concentrically with the external terminal 320.

The battery 10 configured as above is charged by the connection of a power supply for charge or the like to the pair of external terminals 320 and 33, and the application of a voltage. At this time, in the case where the battery 10 is overcharged, or overvoltage is applied to the battery 10, electrolyte solution in the case 20 is decomposed or the like, so that gas is generated and internal pressure (gas pressure) rises in the case 20.

Then, when the internal pressure of the case 20 rises to reach a predetermined value or more, the pressure receiving deformation part 330 and the like (configuration (mechanism) of decoupling the conduction members (configured by the disk shaped conduction member 340, the small diameter part 352 of the outer cylindrical part 350, and the fixing rivet 303)) decouples the disk shaped conduction member 340. Consequently, it is possible to stop supplying a current from the external terminal 320 to the electrode assembly 12, so that it is possible to reduce the generation of gas from the electrolyte solution and the like in the case 20 and to restrain further rise in the internal pressure of the case 20.

In the battery 10 of the present embodiment, in the above conduction members, the parts (such as the small diameter part 352 and the fixing rivet 303) made conductive with the current collector 14 even after the division by the pressure receiving deformation part 330 and the like is connected to the large diameter part (auxiliary terminal) 351. Therefore, in the battery 10, even after the internal pressure of the case 20 rises and the above conduction members are decoupled, it is possible to perform discharging from the electrode assembly 12 in an overcharge state to the outside through the discharge large diameter part 351. That is, it is possible to perform discharging work from the large diameter part (auxiliary terminal) 351 in a state where cables and the like are connected to the external terminals 320 and 33.

The external terminal 320 and the large diameter part (auxiliary terminal) 351 are provided in the terminal part 30A, so that, in the battery 10, portions (i.e., the external terminal 320 and the large diameter part (auxiliary terminal) 351) connected to cables, bus bars and the like during charging work, discharging work, or the like are collected in the terminal part 30A. Consequently, connection work of cables and the like during charging-discharging work is facilitated.

In the battery 10 of the present embodiment, the fragile parts 343 are broken by utilizing the deformation of the pressure receiving deformation part 330 when the internal pressure of the case 20 rises up to the second value, so that the disk shaped conduction member 340 is decoupled.

According to the battery 10 of the present embodiment, the pressure receiving deformation part 330 is disposed so as to configure a part of an energization path in the terminal part 30A, so that the terminal part 30A can be downsized compared to a case where the arrangement space of the pressure receiving deformation part 330 is separately secured at a position deviated from the above energization path.

According to the disk shaped conduction member 340 of the present embodiment, when the internal pressure of the case 20 rises up to the second value due to overcharge or the like, the pressure receiving deformation part 330 is deformed, and the central fixing portion 342 is pulled in a direction separated from the outer portion 341, and the fragile parts 343 are broken. Consequently, the disk shaped conduction member 340 is decoupled, so that it is possible to stop supplying a current from the external terminal 320 to the electrode assembly 12.

In the battery 10 of the present embodiment, the disk shaped conduction member 340 is decoupled before gas in the case 20 rises up to the internal pressure (first value) at which the gas is released from the gas release vent 242 to the outside, and the supply of the current from the outside to the electrode assembly 12 through the external terminal 320 is stopped. Consequently, it is possible to reduce the generation of gas due to the supply of the current to the electrode assembly 12 before the gas release vent 242 is opened (operated), and to restrain the rise in the internal pressure.

In addition, even when the internal pressure continues to rise even after the supply of the current to the electrode assembly 12 is stopped, the gas release vent 242 releases the gas to the outside when the internal pressure rises up to the first value, so that the pressure in the case 20 is reduced. Therefore, it is possible to more reliably prevent the rupture of the case 20 due to the rise in the internal pressure.

The energy storage device of the present invention should not be limited to the above illustrated example, but it goes without saying that various changes can be added without departing from the scope of the present invention.

In the battery 10 of the above embodiment, a configuration of decoupling the energization path for making the external terminal 320 and the current collectors 14 conductive when the internal pressure of the case 20 rises up to the second value (such as the pressure receiving deformation part 330, and the disk shaped conduction member 340) is only provided in the terminal part 30A for the positive electrode. However, the present invention is not limited to this configuration. The above decoupling configuration may be provided in only the terminal part 30B for the negative electrode, or in both of the terminal part 30A for the positive electrode and the terminal part 30B for the negative electrode. That is, the terminal part 30B for the negative electrode may have the same configuration as the terminal part 30A for the positive electrode.

A specific configuration of the mechanism for stopping (or reducing) the supply of a current from the external terminal 320 to the electrode assembly 12 during charging-discharging, and reducing the generation of gas and the like in the case 20, in the battery 10 is not limited. For example, the mechanism for decoupling the conduction members (energization path for connecting the external terminal 320 and the electrode assembly 12) may be, for example, a mechanism for decoupling the conduction members in accordance with a conductive state (such as a fuse), a mechanism for decoupling the conduction members in accordance with a temperature, or the like. That is, the above mechanism may be any mechanism having a configuration of physically cutting off the energization path (such as the conduction members) in a certain condition.

Additionally, the mechanism for stopping (or reducing) the supply of a current from the external terminal 320 to the electrode assembly 12 during charging-discharging, and reducing the generation of gas and the like in the case 20, in the battery 10 is not limited to the configuration of decoupling the energization path, and may be a configuration of deforming a part of the energization path into such a shape as to increase resistance (e.g., reduce a cross sectional area). That is, the above mechanism may have a configuration in which a part of the members configuring the energization path is deformed and the resistance of this part is increased, so that the energization path is brought into a state unlikely to be made conductive.

While a chargeable-dischargeable secondary battery (lithium ion secondary battery) is described in the above embodiment, the type or the size (capacity) of the battery is arbitrary. While a lithium ion secondary battery is described as an example of the energy storage device in the above embodiment, the present invention is not limited to this. For example, the present invention is applicable to various secondary batteries, and additionally applicable to primary batteries, energy storage devices of capacitors such as an electric double layer capacitor.

What is claimed is:
1. An energy storage device, comprising:
   an electrode assembly;
   a case configured to house the electrode assembly;
   a terminal part mounted on the case; and
   a current collector connected to the electrode assembly in the case,
   wherein the terminal part comprises:
      an external terminal including at least a part exposed to outside of the case;
      a conduction member configured to make the external terminal and the current collector conductive;
      a decoupling mechanism configured to decouple the conduction member or hinder a conduction state of the conduction member; and
      an auxiliary terminal disposed spaced from the external terminal and including at least a part exposed to the outside of the case, the auxiliary terminal being electrically connected to the current collector,
   wherein the case includes a case main body including a bottom wall part and a peripheral wall, and configured to house the electrode assembly, and a lid configured to close an opening of the case main body,
   wherein an interval between the current collector and the decoupling mechanism is larger than an interval between the current collector and an outer surface of the lid, as viewed in a normal direction of the lid, and
   wherein the conduction member and the decoupling mechanism are located inside an outer housing, a bottom surface of the outer housing being located above the outer surface of the lid.
2. The energy storage device according to claim 1, wherein the conduction member comprises a fragile part having strength smaller than an other portion in the conduction member, and
   wherein the decoupling mechanism comprises a pressure receiving deformation part disposed at a position where an internal pressure is transmitted, the pressure receiving deformation part being configured to decouple the conduction member by deforming at least a part when the internal pressure rises up to a predetermined value, and breaking the fragile part.
3. The energy storage device according to claim 2, wherein the pressure receiving deformation part has a conductive property, and is connected so as to allow the external terminal and the conduction member to be conductive.
4. The energy storage device according to claim 3, wherein the conduction member comprises:
   the fragile part;
   a first portion fixed to the pressure receiving deformation part; and
   a second portion provided on a side closer to the current collector than the first portion in an energizing direction,
   wherein the fragile part connects the first portion and the second portion, and wherein the pressure receiving deformation part is deformed such that a portion fixed to the first portion is separated from the second portion when the internal pressure rises up to the predetermined value.

5. The energy storage device according to claim 2, wherein the case comprises a gas release vent configured to release gas in the case to the outside when the internal pressure rises up to a first value, and
wherein the fragile part is broken by deformation of the pressure receiving deformation part when the internal pressure of the case rises up to a second value that is greater than normal pressure and less than the first value.

6. An energy storage device, comprising:
an electrode assembly;
a case configured to house the electrode assembly;
a terminal part mounted on the case; and
a current collector connected to the electrode assembly in the case,
wherein the terminal part comprises:
an external terminal including at least a part exposed to outside of the case;
a conduction member configured to make the external terminal and the current collector conductive;
a decoupling mechanism configured to decouple the conduction member when internal pressure of the case rises up to a predetermined value; and
an auxiliary terminal disposed spaced from the external terminal and including at least a part exposed to the outside of the case, the auxiliary terminal being electrically connected to the current collector,
wherein the case includes a case main body including a bottom wall part and a peripheral wall, and configured to house the electrode assembly, and a lid configured to close an opening of the case main body,
wherein an interval between the current collector and the decoupling mechanism is larger than an interval between the current collector and an outer surface of the lid, as viewed in a normal direction of the lid, and
wherein the conduction member and the decoupling mechanism are located inside an outer housing, a bottom surface of the outer housing being located above the outer surface of the lid.

7. The energy storage device according to claim 1, wherein the case further includes a rivet configured to penetrate the lid, and
wherein the interval between the current collector and the decoupling mechanism is larger than an interval between the current collector and an outer surface of the rivet, as viewed in the normal direction of the lid.

8. The energy storage device according to claim 1,
wherein a conduction path between the external terminal and the current collector and a conduction path between the auxiliary terminal and the current collector pass through a single penetration hole provided in the lid.

9. The energy storage device according to claim 1, wherein the part of the auxiliary terminal exposed to the outside of the case is provided substantially concentrically with the part of the external terminal exposed to the outside of the case.

10. The energy storage device according to claim 9, wherein the auxiliary terminal comprises a cylindrical large diameter part, and a cylindrical small diameter part, and at least the large diameter part is exposed to the outside of the case, and
wherein the external terminal, the conduction member, and the decoupling mechanism are each at least partially housed in the large diameter part.

11. The energy storage device according to claim 1, wherein the case comprises a prismatic cylindrical shape or a circular cylindrical shape.

12. An energy storage device, comprising:
an electrode assembly;
a case including a case main body including a bottom wall part and a peripheral wall, and configured to house the electrode assembly, and a lid configured to close an opening of the case main body;
a terminal part mounted on the lid; and
a current collector connected to the electrode assembly in the case,
wherein the terminal part comprises:
an external terminal including at least a part exposed to outside of the case;
a conduction member configured to make the external terminal and the current collector conductive;
a decoupling mechanism configured to decouple the conduction member, when internal pressure of the case rises up to a predetermined value; and
an auxiliary terminal disposed spaced from the external terminal, and including at least a part exposed to the outside of the case, the auxiliary terminal being electrically connected to the current collector,
wherein an interval between the current collector and the decoupling mechanism is larger than an interval between the current collector and an outer surface of the lid, as viewed in a normal direction of the lid,
wherein the case includes a case main body including a bottom wall part and a peripheral wall, and configured to house the electrode assembly, and a lid configured to close an opening of the case main body,
wherein an interval between the current collector and the decoupling mechanism is larger than an interval between the current collector and an outer surface of the lid, as viewed in a normal direction of the lid, and
wherein the conduction member and the decoupling mechanism are located inside an outer housing, a bottom surface of the outer housing being located above the outer surface of the lid.

13. The energy storage device according to claim 1, wherein the conduction member is disposed below a bottom surface of the decoupling mechanism, and
wherein the normal direction of the lid includes a stacking direction of the conduction member, the decoupling mechanism, and the external terminal on each other in the outer housing.

14. The energy storage device according to claim 13, wherein the auxiliary terminal is disposed on a bottom surface of the conduction member.

15. The energy storage device according to claim 14, wherein the decoupling mechanism is disposed on a bottom surface of the external terminal.

16. The energy storage device according to claim 13, wherein an upper surface of the decoupling mechanism abuts a bottom surface of the external terminal.

17. The energy storage device according to claim 16, wherein the auxiliary terminal abuts a bottom surface of the conduction member.

18. The energy storage device according to claim 13, wherein, after the decoupling mechanism decouples the conduction member, the auxiliary terminal remains conductive with the current collector.

19. The energy storage device according to claim 13, wherein, in the stacking direction of the conduction member, the decoupling mechanism, and the external terminal that are sequentially stacked on each other, outer edges of the external terminal overlap with outer edges of the decoupling mechanism.

20. The energy storage device according to claim 13, wherein the decoupling mechanism is disposed on a bottom surface of the external terminal.

* * * * *